(12) United States Patent
Shetty et al.

(10) Patent No.: US 12,487,750 B1
(45) Date of Patent: Dec. 2, 2025

(54) USE OF RELIABILITY PREDICTIONS FOR SELECTION OF DATA STORAGE DEVICES

(71) Applicant: Dell Products L.P., Round Rock, TX (US)

(72) Inventors: Sudhir Vittal Shetty, Cedar Park, TX (US); Vijayasimha Reddy Naga, Georgetown, TX (US); Thomas L. Watson, Richardson, TX (US); Deepak Nagarajegowda, Raleigh, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/789,904

(22) Filed: Jul. 31, 2024

(51) Int. Cl.
*G06F 3/06* (2006.01)

(52) U.S. Cl.
CPC ......... *G06F 3/0614* (2013.01); *G06F 3/0653* (2013.01); *G06F 3/0679* (2013.01)

(58) Field of Classification Search
CPC ....................................................... G06F 3/06
See application file for complete search history.

(56) References Cited

U.S. PATENT DOCUMENTS

| 11,809,727 B1* | 11/2023 | Tuzzolino | G11C 16/08 |
| 2018/0150330 A1* | 5/2018 | Bernat | G06F 8/654 |

* cited by examiner

*Primary Examiner* — Khoa D Doan
(74) *Attorney, Agent, or Firm* — WOMBLE BOND DICKINSON (US) LLP

(57) ABSTRACT

Methods and systems for managing performance of workloads are disclosed. The performance of the workloads may be managed by choosing a data storage device for the performance of a workload. The data storage device may be chosen by selecting the data storage of data storage devices with a highest reliability prediction. The reliability prediction of the data storage device may be a likelihood of the data storage device of a data processing system to retain the data while performing the workload. The data processing system may be chosen by selecting the data processing system of data processing systems with the highest reliability prediction. The reliability prediction of the data processing system may be a weighted sum of reliability predictions and weights of the data storage devices.

20 Claims, 11 Drawing Sheets

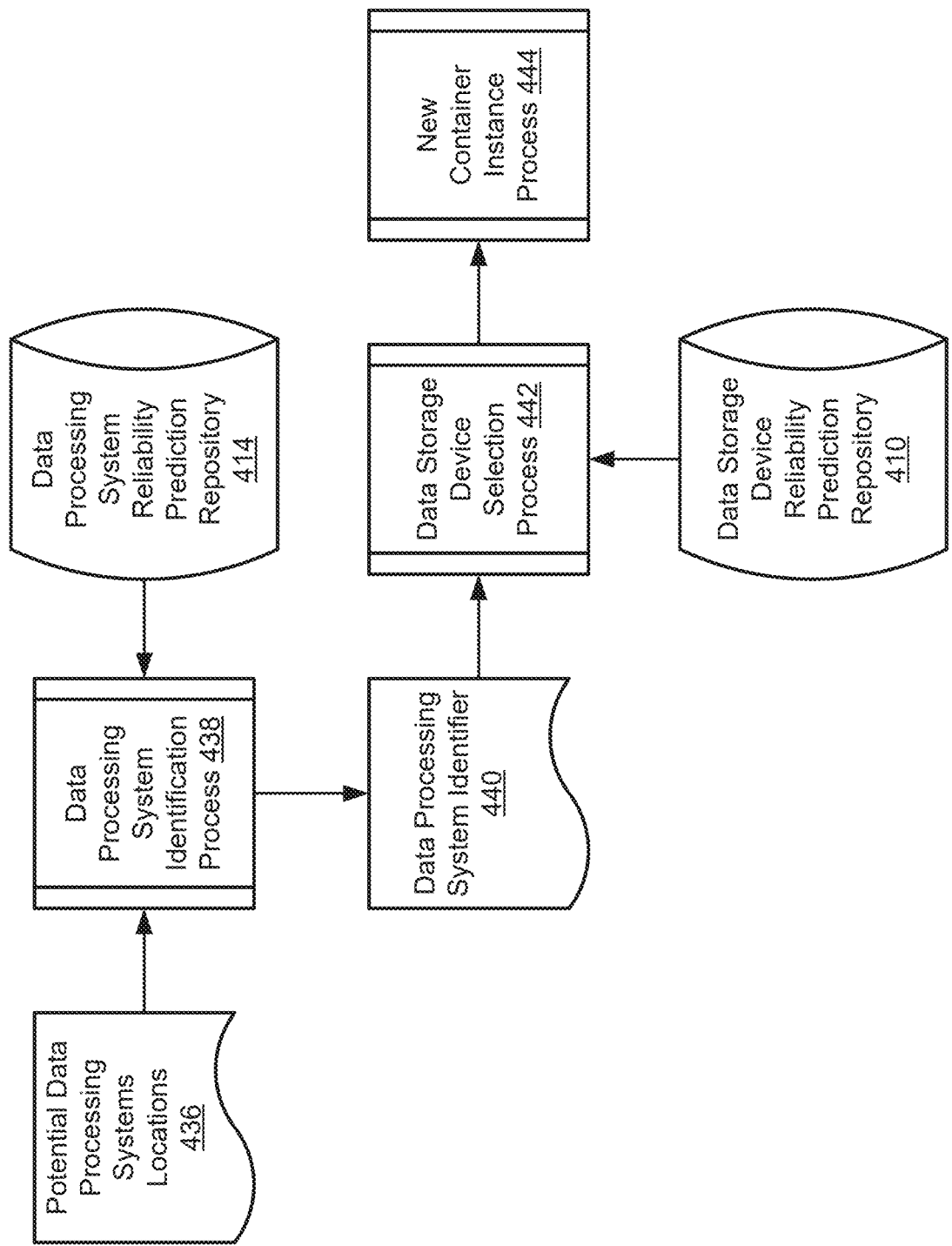

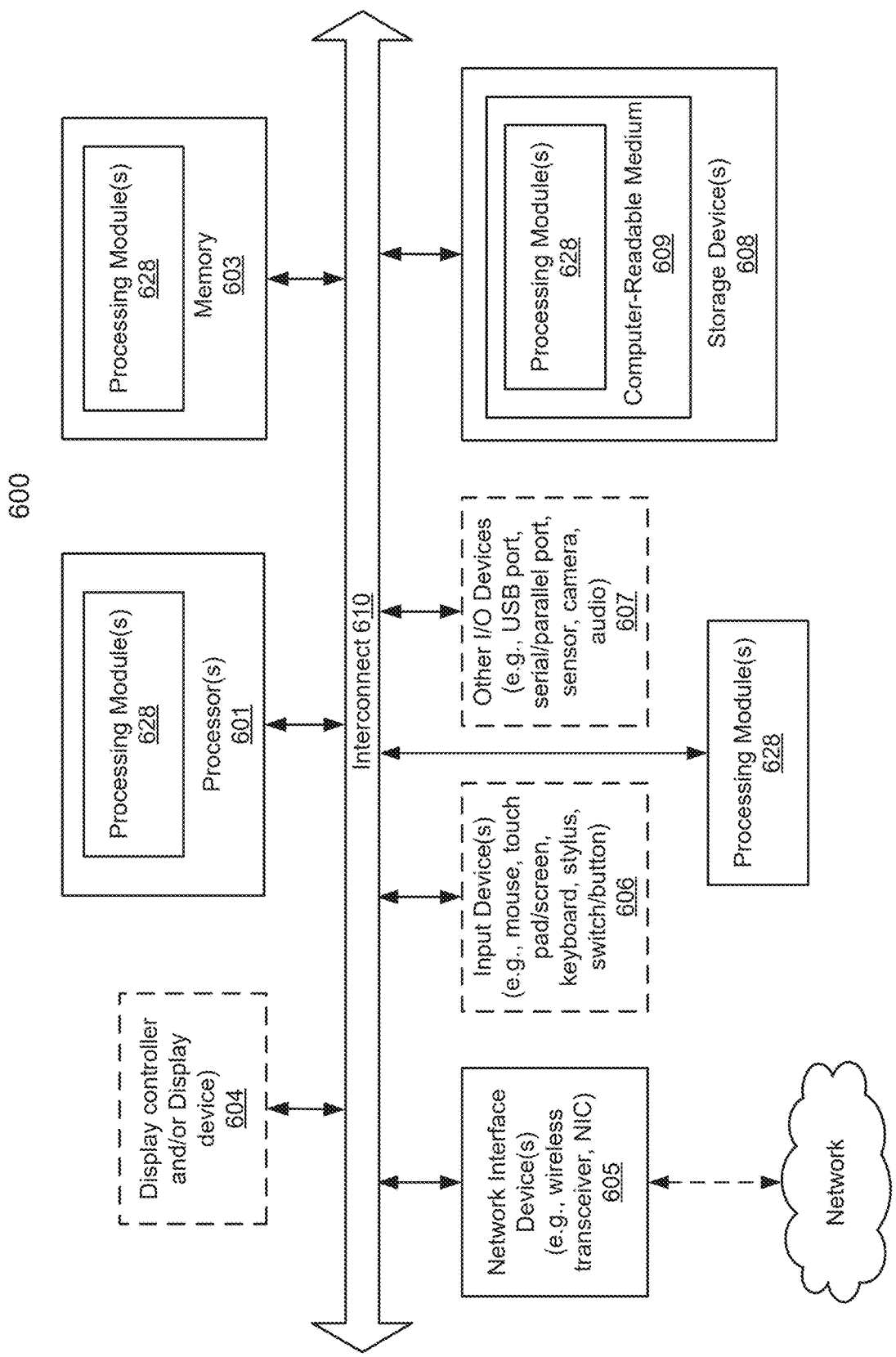

USE OF RELIABILITY PREDICTIONS FOR SELECTION OF DATA STORAGE DEVICES

FIELD

Embodiments disclosed herein relate generally to managing performance of workloads. More particularly, embodiments disclosed herein relate generating a measure of reliability of a data storage device to perform a workload.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 4A-4C show data flow diagrams illustrating operation of a system in accordance with an embodiment.

FIG. 6 shows a block diagram illustrating a data processing system in accordance with an embodiment.

DETAILED DESCRIPTION

Figure 1A:
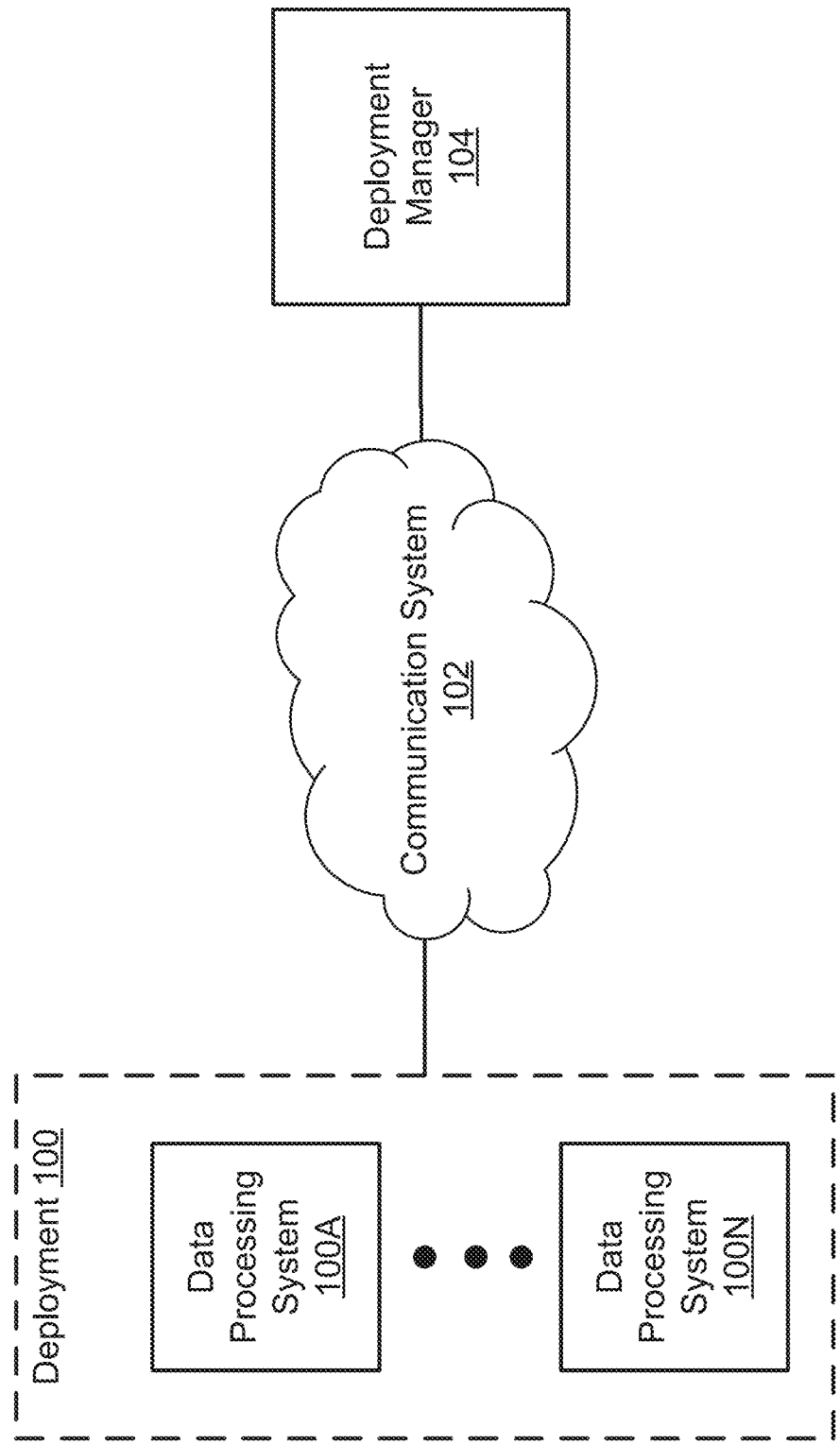
FIG. 1A shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing performance of workloads. The workloads may be managed by monitoring for failure of storage devices. Failure of storage devices may be monitored by ingesting a use quantification and diagnostic data in a predictive algorithm and obtaining a prediction that may indicate failure.

The use quantification may be determined from use data and predicted future use data for one future data of a set of future dates. The use data may include information relating to, at least, storage utilization, central processing unit utilization, and storage capacity of the storage drive. The use quantification may be a weighted sum of the use data and the predicted future use data. The diagnostic data may include information relating to, at least, read statistics, physical condition, and error counts of the storage device.

Using a prediction of failure of the storage device by the predictive algorithm, proactive steps may be taken to ensure continued operation of the storage device. Proactive steps may include increasing the frequency of telemetry data from the storage device, shifting a workload from the storage device to another storage device, and initiating servicing of the storage device.

The prediction of the failure of the storage device may also be used to generate a prediction of reliability of the storage device. The prediction of the reliability may be a measure of how well data is retained by the storage device in performance of a workload. The prediction of the reliability may be conversely related to the prediction of the failure. For a data processing system, a prediction of reliability may be generated based on at least one prediction of the reliability for at least one data storage device.

To manage the workload, a data processing system with which perform the workload may be selected based on the prediction of the reliability of the data processing system. Once the data processing system is selected, the storage device on the data processing system with which to perform the workload may be selected using the prediction of the reliability for the storage device. Once the storage device is selected, a container instance may be deployed on the storage device to perform the workload.

In an embodiment, a method for managing performance of workloads is disclosed. The method may include: (i) obtaining a request for performance of a workload of the workloads, (ii) identifying requirements for the workload, the requirements comprising a minimum deployment location reliability prediction (iii) analyzing potential deployment locations for the workload based on the requirements and deployment reliability predictions for the potential deployment locations to identify one of the potential deployment locations (iv) instantiating at least one entity at the one of the potential deployment locations to perform the workload, and (v) performing the workload using the at least one entity hosted by the one of the potential deployment locations.

The method may further include, before obtaining the request for the performance of the workload: (i) obtaining a data storage device failure prediction for a storage device and (ii) obtaining, using at least the data storage device failure prediction, a data storage device reliability weight corresponding to the data storage device, and a deployment location identifier for a deployment location that hosts the storage device, a deployment location reliability prediction.

The deployment location reliability prediction may be a measure of likelihood that a data processing system will retain data generated performance of the workload.

The deployment location reliability prediction may be obtained using data storage device failure predictions corresponding to all of data storage devices of the deployment location that are available for contributing storage resources to performance of the workload.

The one of the potential deployment locations may include a data processing system with at least one data storage device which contributes storage resources to the performance of the workload.

The entity may include at least one container, the container running an application using, at least in part, the storage resources contributed by the at least one data storage device of the data processing system.

The workload may include at least one service that is provided when the application runs on the data processing system.

A deployment reliability prediction of the deployment reliability predictions for the potential deployment locations may be determined using a weighted sum of data storage device failure weights corresponding to data storage devices for a data processing system and data storage reliability predictions corresponding to the data storage devices for the data processing system, a data storage reliability prediction of the data storage reliability predictions being based on the data storage device failure prediction for the data storage device.

Selection, by the entity, of the at least one data storage device may be determined by the data storage reliability predictions.

Analyzing the potential deployment locations for the workload may include (i) obtaining a deployment location availability for the one of the potential deployment locations, the deployment location availability comprising a timeframe during which the workload can be performed at the one of the potential deployment locations, (ii) evaluating, based on the requirements for the workload, whether the workload can be performed by the one of the potential deployment locations during the deployment location availability (iii) obtaining, for the one of the potential deployment locations, the deployment location reliability prediction; and (iv) evaluating, based on the requirements for the workload, whether the deployment location reliability prediction at least meets a minimum reliability threshold for the performance of the workload.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1A, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, data may need to be stored and retrieved in the future. To store and retrieve the data, one or more hard disk drives (HDDs), solid-state drives (SSDs), and/or other types of storage devices (e.g., "data storage devices") may provide data storage services.

However, over time the data storage devices may be subject to failure and/or other forms of undesired operation. If the data storage devices experience undesired operation, then the data storage devices may be unable to provide all, or a portion of the data storage services.

Further, the computer implemented services may be impacted if the data storage devices are unable to provide the data storage services. For example, data that is necessary to provide the computer implemented services may be unable to be stored and/or retrieved, the rate of data storage/retrieval may be slower than expected, and/or the computer implemented services may be impacted in other manners.

In general, embodiments disclosed here relate to systems and methods for managing performance of workloads. To manage performance of workloads, predictions for future failures of the storage devices may be obtained and used to reduce potential impacts of the predicted data storage device failures.

To predict the storage device failure, the data storage devices may be monitored. The data storage devices may be monitored via (i) self-reporting mechanisms regarding device health (e.g., Self-Monitoring, Analysis and Reporting Technology (SMART)), and (ii) via system reporting mechanisms regarding device use (e.g., operating system reports of use of the data storage devices).

The system reporting of the data storage device use may be used to predict the workloads (e.g., or a normalized quantity, such as a workload index) for the data storage devices. The predicted workloads and self-reported data storage device may be used to predict if and/or when a data storage device is likely to fail in the future.

If a failure is predicted to occur, various proactive actions may be performed to reduce impacts of the predicted failure. For example, the data storage device may be replaced, the use of the data storage device may be reduced, and/or other actions may be performed to manage potential impacts of the predicted failure.

A prediction for the failure may be reported as a numerical quantity. For example, a failure index may be generated that ranges between 0 and 1, where 1 is a high likelihood of failure for the data storage device. As the numerical quantity of the failure index increases, a likelihood may increase that the data storage device may not retain data during operation.

Using failure indices of data storage devices within a data processing system, a reliability prediction for the data processing system may be generated. The reliability prediction may be generated using a weighted sum of reliability predictions for the data storage devices and weights for the data storage devices. A reliability prediction for the data storage device may be measure of the likelihood that data may be retained on the data storage device without a failure of operation by the data storage device. The weights may be a measure of contribution of operation, storage space, etc. by the data storage device to the data processing system.

Reliability predictions of data processing systems may be used, for example, for selection of the data processing system on which to deploy a container. The container may be used to perform a workload by running at least one application to provide at least one computer implemented service. The reliability predictions of the data processing systems may be filtered to generate a set of the reliability predictions with high values. The reliability predictions may be filtered based on (i) a minimum reliability threshold required for the workload, (ii) an availability of the data processing system, (iii) available disk storage space on at least one disk storage drive of the data processing system, etc.

Once the reliability predictions, the data processing systems may be ranked based on a magnitude of the reliability predictions for the data processing systems. With a higher reliability prediction, a higher ranking may be assigned to the data processing system of the data processing systems. The data processing system with the highest ranking may be selected for deployment of the container.

To deploy the container, a data storage device of the data storage devices on the data processing system may be chosen. The data storage device may be chosen by selecting a data storage device with a highest reliability prediction on the data processing system. Once the data storage device is selected, a container image may be instantiated on the data storage device on the data processing system. Using the container image, the at least one computer implemented service may be provided by a deployment.

To provide the above noted functionality, the system may include deployment 100, and deployment manager 104. Each of these components is discussed below.

Figure 1B:
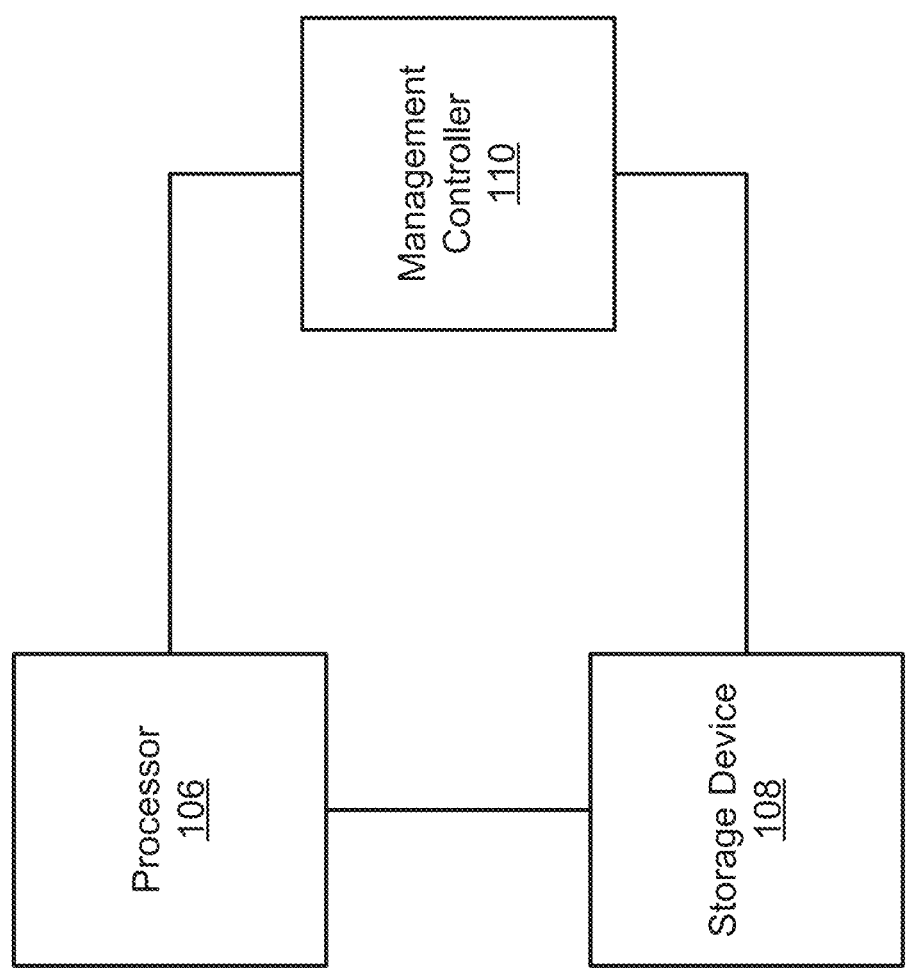
FIG. 1B shows a diagram illustrating portions of a data processing system in accordance with an embodiment.

Deployment 100 may include any number of data processing system 100A-100N. The data processing systems may provide all, or a portion, of the computer implemented services provided by the system of FIG. 1A. To do so, each data processing system may include hardware components such as storage devices, processors, etc. Refer to FIG. 1B for additional details regarding the hardware components of the data processing systems 100A-100N.

During operation, data processing system 100A-100N may (i) track the health and use of data storage device (e.g., in aggregate data storage device information), (ii) use the tracked data storage device information to predict future data storage device failures, and/or (iii) attempt to manage the impacts of predicted data storage device failure. To use the tracked data storage device information to predict data storage device failures, the data storage device information may be provided to other devices (e.g., deployment manager 104) and/or may be used logically with an inference model that may ingest and use the ingested data storage device information to predict future failures.

In addition, data processing system 100A-100N may (i) track a storage capability a data processing system and (ii) use the storage capability of the data processing system to predict a reliability of future storage capability of the data processing system. To track the storage capability of the data processing system, data processing system 100A-100N may compute a measure of reliability based on the health of the data storage devices of the data processing system. The measure of the reliability may be ingested by an inference model to compute a future reliability of the data processing system.

Deployment manager 104 may manage computer implemented services provided by deployment 100. To do so, deployment manager 104 may (i) collect the data storage device information, (ii) use the data storage device information to predict future data storage device failures, and (iii) attempt to mitigate the potential impacts of predicted data storage device failures.

To mitigate the potential impacts of the predicted data storage device failures, deployment manager 104 may, for example, (i) schedule replacement of data storage device, (ii) schedule service of data storage device, (iii) modify the operation of deployment 100 to reduce use of data storage devices that have been predicted to fail in the future, (iv) initiate generation of backups of data stored in data storage device that are predicted to fail in the future, and/or (v) perform other actions that are likely to reduce the potential impacts of data storage device failures.

Other actions may include (i) using a failure prediction of the data storage devices to generate reliability predictions of the data storage devices, (ii) using the reliability predictions of the data storage devices to generate the reliability predictions of data processing systems that use the data storage devices, and (iii) selecting the data processing systems and the data storage devices, based on the reliability predictions, for performance of workloads. Upon selecting a data processing system and a data storage device, deployment manager 104 may assign containers to the data storage device of the data processing system to perform a workload. The data storage device to which a container may be assigned may be able to retain data during the performance of the workload. Deployment manager 104 may monitor the performance of the workload and update a measure of the reliability of the data storage device.

While providing their functionality, any of deployment 100 and deployment manager 104 may perform all, or a portion, of the flows and methods shown in FIGS. 2A-3 and FIGS. 4A-5B.

Any of (and/or components thereof) deployment 100 and deployment manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 6.

Any of the components illustrated in FIG. 1A may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1A as including a limited number of specific components, a system in accordance with an embodiment may include fewer, additional, and/or different components than those components illustrated therein.

Turning to FIG. 1B, a portion of a data processing system in accordance with an embodiment is shown. To provide the above noted functionality, a data processing system may include processor 106, storage device 108, and management controller 110. Each of these components is discussed below.

Processor 106 may be implemented using a hardware processor such as a central processing unit and/or other types of processing devices. Processor 106 may be coupled to storage device 108 via an in-band channel to facilitate storage and use, by processor 106, of data in storage device 108.

Storage device 108 may be implemented using any type of physical data storage device such as a hard disk drive.

Management controller 110 may be implemented with a baseband controller (e.g., an independently operating computing system) operably connected to processor 106 and/or storage device 108 via one or more out-of-band channels. Via these channels, management controller 110 may collect health information regarding storage device 108 (e.g., which it may self-report) and use information regarding storage device 108 (e.g., an operating system executing on processor 106 may manage use of storage device 108, and may track various information regarding the use of storage device 108 such as input-output (IO) size, queue lengths, latency, bandwidth/throughput, IO per unit time (IOPS).

Additionally, management controller 110 may collect use information for processor 106 (e.g., processor utilization rates over time), capacity information (e.g., total space, total free space, total used space, etc.) for storage device 108, and/or other telemetry information from hardware components of a data processing system.

Figure 2A:
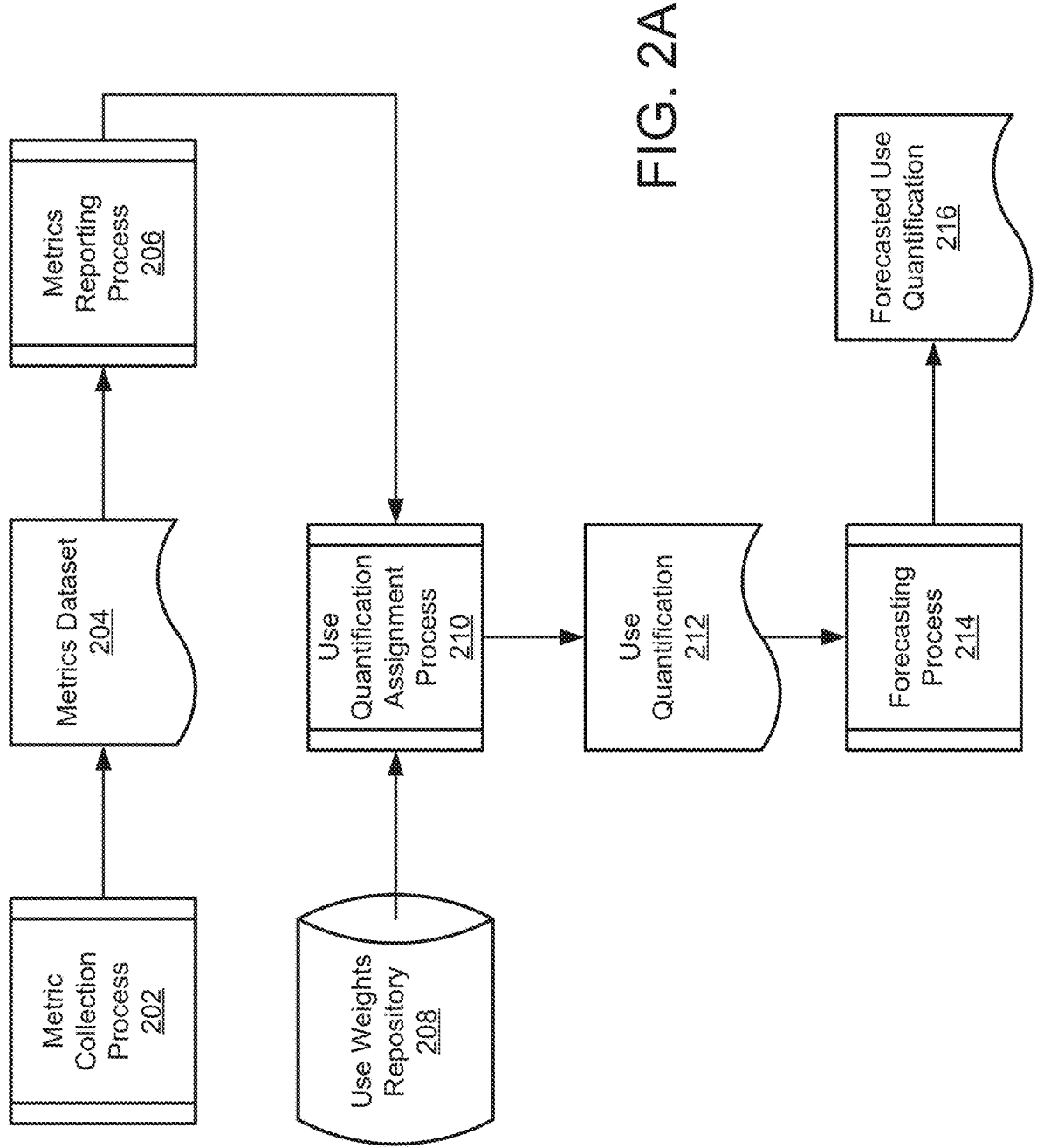
FIGS. 2A-2B show data flow diagrams illustrating operation of a system in accordance with an embodiment.
Figure 2B:
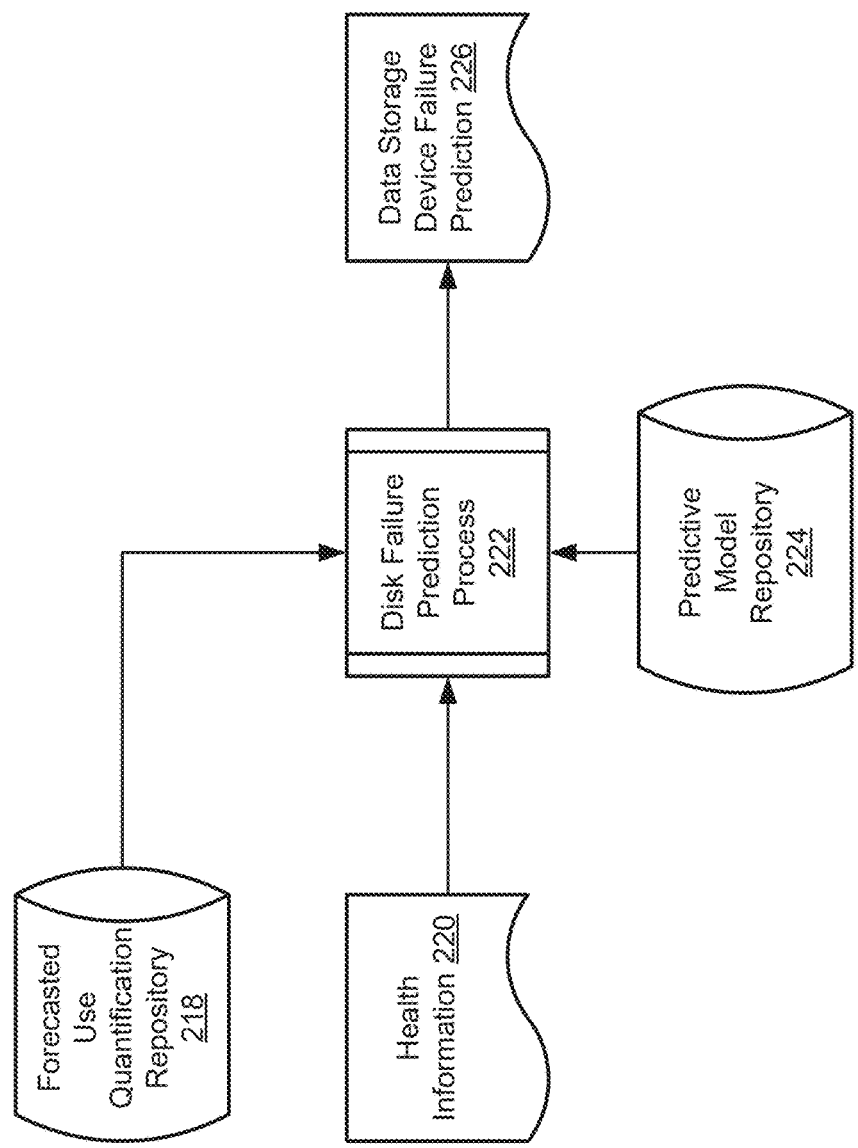

The collected information may be provided to deployment manager 104 for further processing (e.g., failure prediction generation), and/or may be used locally for failure prediction generation). Refer to FIGS. 2A-2B for additional information regarding failure prediction.

While illustrated in FIG. 1B as including a limited number of specific components, a data processing in accordance with an embodiment may include fewer, additional, and/or different components (e.g., as shown in FIG. 6) than those components illustrated therein without departing from embodiments disclosed herein.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 200A, 200N, 212, 216, etc.) is used to represent data structures, a second set of shapes (e.g., 202, 206, etc.) is used to represent processes performed using and/or that generate data, and a third set of shapes (e.g., 208, 218, etc.) is used to represent large scale data structures such as databases.

Turning to FIG. 2A, a first data flow diagram in accordance with an embodiment is shown. The first data flow diagram may illustrate data used in and data processing performed in acquisition of data used to predict if and when a data processing system is likely to fail in the future.

To predict if and when a data storage device is likely to fail (or otherwise operate in an undesired manner) in the future, metric collection process 202 may be performed. During metric collection process 202, various metrics regarding the operation of data storage devices of a data processing system is collected. The metrics may be aggregated as metrics dataset 204.

To collect the metrics, a management controller of a host data processing system may communicate with both the data storage devices and other hardware components. The data storage devices may provide health information for each respective data storage device. The other hardware components may provide information regarding (i) the use of the data storage devices, and/or (ii) use of the other hardware components. For example, the management controller may, to obtain the use information, issue a request to an operating system executing on a processor. The request may cause the operating system (which may manage use of storage devices) to quantify and provide information regarding the use of the data storage devices, the processor, and/or other hardware components of the data processing systems.

Thus, metric dataset 204 may include health information for storage devices (e.g., the health information may include, for example, temperature, unexpected power loss event count, erase fail count, power-on hours, and/or raw head error rate), use information for the data storage devices, and use information for other hardware components of the data processing system.

Once metrics dataset 204 is obtained, metrics reporting process 206 may be performed. During metrics reporting process 206, metrics dataset 204 may be provided to other entities such as deployment manager 104. Once metrics dataset 204 is obtained, use quantification assignment process 210 may be performed.

During use quantification assignment process 210, a workload index (or other normalized quantification) regarding the use of each data storage device may be obtained. To obtain the workload index, the use information for each respective data storage device may be ingested into a model, function, and/or other type of quantification model. The quantification model may have an analytic form the provides the workload index as a function of the use information. The analytic form may be a weighted sum of the attributes from metrics dataset 204. The resulting workload index may be stored as use quantification 212.

Once use quantification 212 is obtained, forecasting process 214 may be performed. During forecasting process 214, future workload indexes may be predicted using use quantification 212. For example, previously collected time series of workload indexes for various data storage devices may be used with linear regression, machine learning, and/or other models to obtain one or more forecasting models. When use quantification 212 is ingested into the forecasting model, various predicted workload indexes for future points in time may be obtained (e.g., one or more months or years into the future).

Thus, when forecasting process 214 is complete, a set of workload indexes from the present out into the future may be obtained. Once these workload indexes are obtained, final aggregate workload indexes may be obtained. To obtain the final aggregate workload indexes, forecasted use quantification 216 may be performed. During forecasted use quantification 216, weighted sums of the current and predicted workload indexes may be obtained for each prediction period.

For example, if a current workload index has a value of 0.5, and a predicted workload index for 3-months into the future has a value of 0.8, then the final forecasted use quantification (e.g., a final aggregated workload index) may be obtained for the 3-month into the future period of time by weighting the current value of 0.5 by a first weight, weighting the predicted value of 0.8 by a second weight, and summing the weighted values (e.g., if a weight for the current value is 0.75 and a weight for the predicted value is 0.25, then the final value may be 0.5*0.75+0.8*0.25=0.575). Thus, the final forecasted use quantification for a point in time three months into the future may be 0.575.

Any number of forecasted use quantification may be calculated in this manner and used to predict the likelihood of failure of a data storage device. These predicted use quantifications may be stored in a repository, such as forecasted use quantification repository 218, discussed with respect to FIG. 2B.

Turning to FIG. 2B, a second data flow diagram in accordance with an embodiment is shown. The second data flow diagram may illustrate data used in and data processing performed in prediction of data storage device failures (and/or other undesired operation of data storage devices).

To predict data storage device failure, disk failure prediction process 222 may be performed. During disk failure prediction process 222, health information 220 and final forecasted use quantifications (e.g., from forecasted use quantification repository 218) for different periods of time may be ingested into various prediction models stored in predictive model repository 224. The predictive models may predict if and when storage devices are likely to fail in the future based on the ingested information.

For example, predictive model repository 224 may include various predictive models such as linear regression models, machine learning models, and/or other types of models trained using training data (e.g., similar to the information in forecasted use quantification repository 218 and health information 220 but for past occurrences of failures of data storage devices thus providing corresponding labels).

The resulting predicted data storage device failures may be stored as data storage device failure prediction 226.

Once obtained, data storage device failure prediction 226 may be used to manage impacts of any predicted failures. For example, failures may be keyed to various actions. The keyed actions may be selected and queued for performance to manage potential impacts of the predicted data storage device failures.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3:
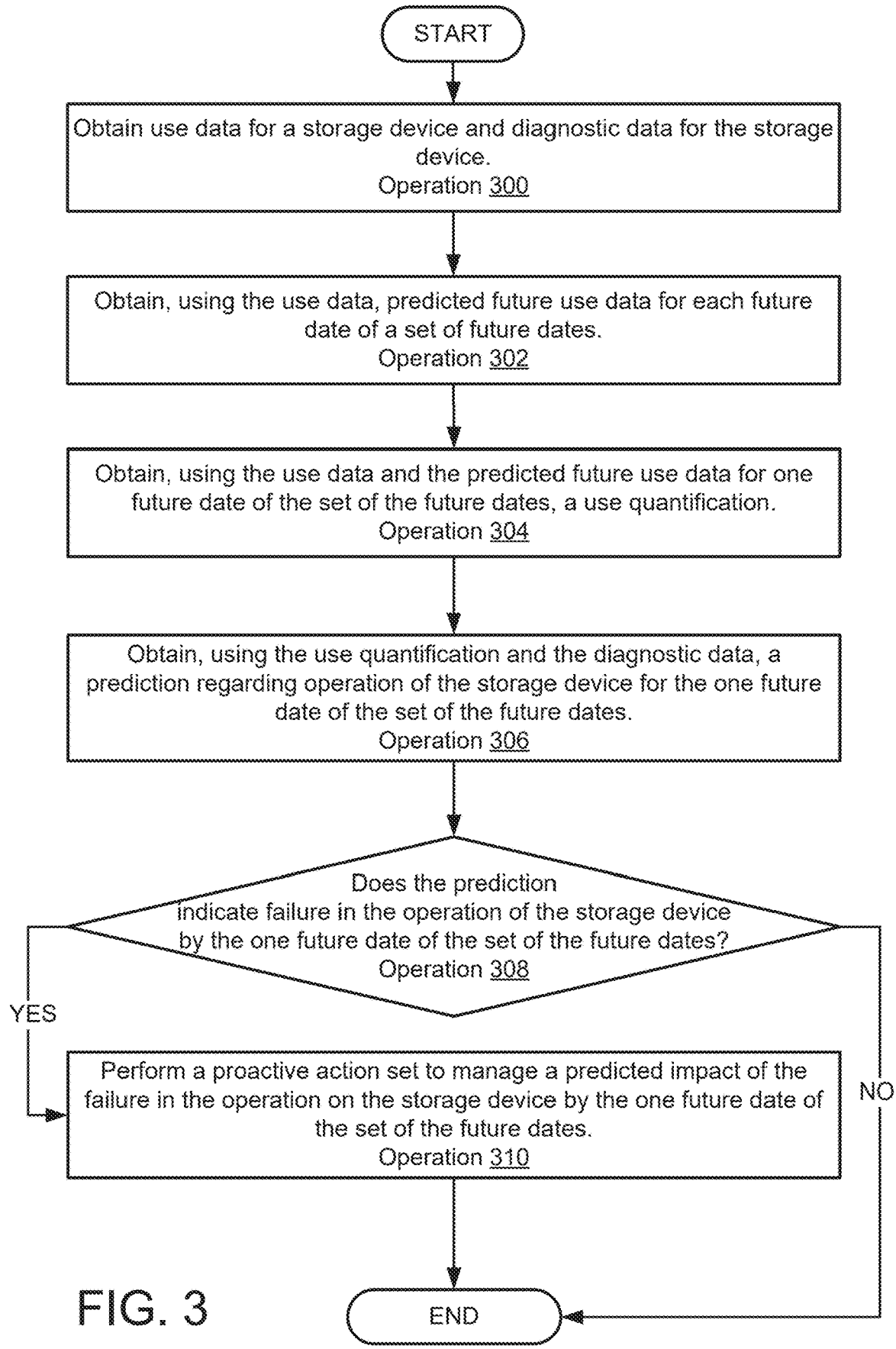
FIG. 3 shows a flow diagram illustrating a method in accordance with an embodiment.

As discussed above, the components of FIGS. 1A-1B may perform various methods to manage data processing systems. FIG. 3 illustrates a method that may be performed by the components of the system of FIGS. 1A-1B. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing data processing systems in accordance with an embodiment is shown. The method may be performed, for example, by any of the components of the system of FIGS. 1A-1, and/or other components not shown therein.

At operation 300, use data for a storage device and diagnostic data (e.g., health information) for a storage device may be obtained. Use data for a storage device and diagnostic data for a storage device may be obtained by a management controller. The management controller may issue out-of-band requests to the storage device and/or other hardware components of the data processing system.

At operation 302, predicted future use data for each future data of a set of future dates may be obtained using the use data. The predicted future use data for each of the future data of the set of the future dates may be obtained by ingesting the set of the future dates and/or the obtained use data into a predictive algorithm to obtain the predicted future use data.

At operation 304, a use quantification may be obtained using the use data and the predicted future use data for each future date of the set of future dates. The use quantification may be obtained by obtaining a weighted sum of the use data and the future use data for the one future date of the set of future dates. The weighted sum of the use data and the future use data may be obtained by ingesting the use data and the future use data into a summation that weights the use data and the future use data with predefined weights.

At operation 306, a prediction regarding operation of the storage device for the one future date may be obtained using the use quantification and the diagnostic data. The prediction may be obtained by ingesting the use quantification and the diagnostic data in a predictive algorithm to obtain the prediction.

At operation 308, a determination may be made regarding whether the prediction indicates failure in the operation of the storage device by the one future date of the set of the future dates. The prediction may directly indicate whether a failure is predicted.

If the prediction indicates failure in the operation of the storage device by the one future date of the set of the future dates, then the method may proceed to operation 310. Otherwise, if the prediction does not indicate failure in the operation of the storage device by the one future date of the set of the future dates, then the method may end following operation 308.

At operation 310, a proactive action set may be performed to manage the predicted impact of the failure in the operation on the storage device by the one future date of the set of the future dates. The proactive action set may be performed by performing at least one action selected from a list of actions consisting of: (i) increasing a frequency of requests for telemetry data from the storage device, the telemetry data comprising at least one of the use data and the diagnostic data; (ii) initiating performance of a diagnostic workload on the storage device and monitoring an operation of the storage device while performing the diagnostic workload; (iii) removing a workload from the storage device (e.g., electing to store data elsewhere); and (iv) scheduling servicing of the storage device by a technician.

A frequency of requests for telemetry data from the storage device may be increased by sending requests for the use data and/or the diagnostic data to the management controller at an increased frequency. The performance of the diagnostic workload may be initiated and the operation may be monitored by implementing diagnostic tests and observing responses from the diagnostic tests on the storage device. A workload from the storage device may be removed by moving the workload from the storage device to another storage device. Servicing of the storage device by a technician may be scheduled by setting one or more times for the technician to repair the storage device.

The method may end following operation 310.

While FIGS. 2A-3 clarify embodiments related to prediction of a failure in operation of a data storage device, FIGS. 4A-5B may clarify embodiments related to use of the prediction of the failure in the operation of the data storage device. The prediction of the failure in the operation of the data storage device may be used to select the data storage device for provision of computer implemented services.

Figure 4A:
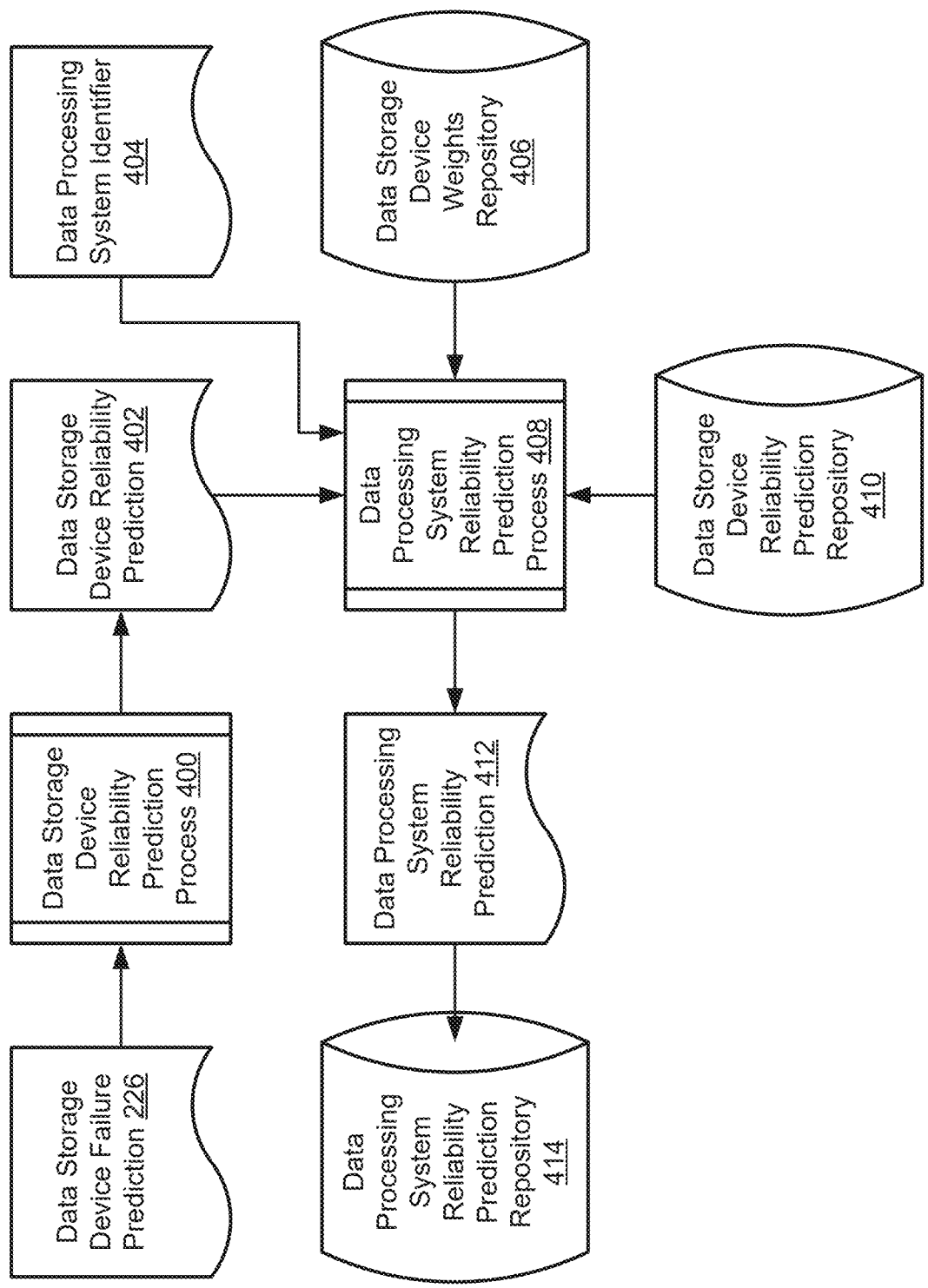
Figure 4B:
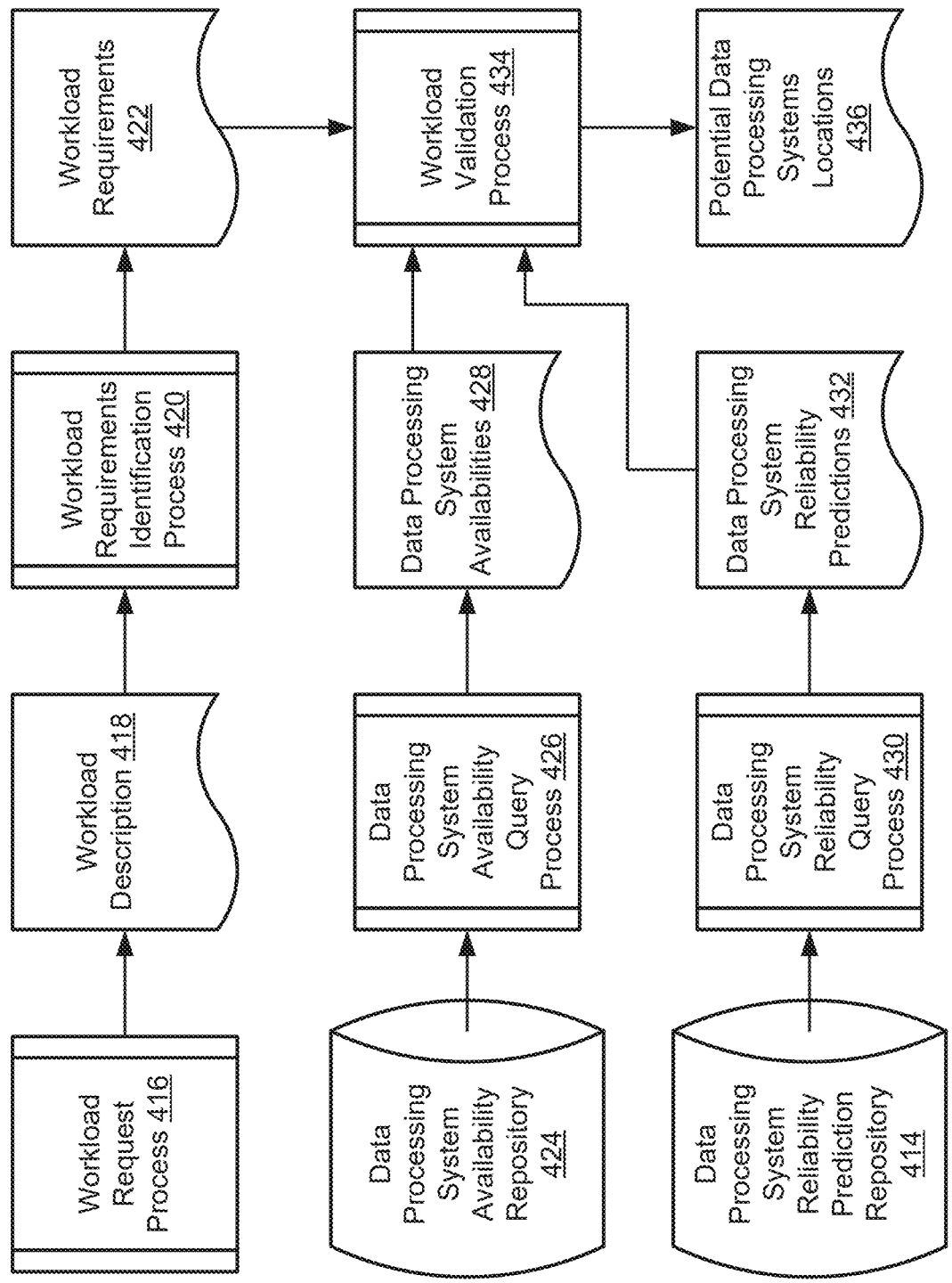

To further clarify embodiments disclosed herein, data flow diagrams in accordance with an embodiment are shown in FIGS. 4A-4C. In these diagrams, flows of data and processing of data are illustrated using different sets of shapes. A first set of shapes (e.g., 402, 412, etc.) is used to represent data structures, a second set of shapes (e.g., 400, 408, etc.) is used to represent processes performed using and/or that generate data, and a third set of shapes (e.g., 406, 410, etc.) is used to represent large scale data structures such as databases.

Turning to FIG. 4A, third data flow diagram in accordance with an embodiment is shown. The third data flow diagram may illustrate data used in and data processing performed in generation of a reliability prediction for a data processing system.

To generate the reliability prediction for the data processing system, data storage device reliability prediction process 400 may be performed. During data storage device reliability prediction process 400, data storage device failure prediction 226 may be ingested. Data storage device failure prediction 226, from the description of FIG. 2B, may be related to a health state of a data storage device. The health state may be based on a capability of the data storage device to retain data while performing a workload. The workload may include, for example, running at least one application to provide at least one computer implemented service.

Using data storage device failure prediction 226, a reliability prediction for the data storage device may be generated. The reliability prediction may be based on a storage capability of the data storage device to retain data and may be conversely related to data storage device failure prediction 226. The reliability prediction may be data storage device reliability prediction 402. As a value for data storage device failure prediction 226 decreases, a second value for data storage device reliability prediction 402 device may increase. Similarly, as the value for data storage device failure prediction 226 increases, the second value for data storage device reliability prediction 402 may decrease.

Using data storage device reliability prediction 402, data processing system reliability prediction process 408 may be performed. During data processing system reliability prediction process 408, the storage capability of a data processing system may be generated.

To generate the storage capability of the data processing system, the data processing system may first be identified. To identify the data processing system, data processing system identifier 404 may be obtained. Data processing system identifier 404 may be obtained by reading a registry of data processing systems and extracting an identifier for the data processing system. Data processing system identifier 404 may include, for example, a serial number and/or an identification number by which to identify the data processing system.

With the data processing system identified, reliability predictions and/or weights for at least one data storage device of the data processing system may be obtained. The reliability predictions may be obtained by selecting the reliability predictions on the data processing system from data storage device reliability prediction repository 410. Similarly, the weights may be obtained by selecting the weights for the at least one data storage device on the data processing system from data storage weights repository 406. A weight of the weights may include a measure of contribution by attributes of a data storage device to the data processing system, such as storage capacity, processing speed, power consumption, etc.

Using the reliability predictions and the weights for the data storage devices, including data storage device reliability prediction 402, data processing system reliability prediction 412 may be generated. Data processing system reliability prediction 412 may be generated by obtaining a weighted sum of the repository predictions and the weights for the data storage devices, including data storage device reliability prediction 402. With a higher value for data processing system reliability prediction 412, the data processing system may be more likely to retain data during performance of the workload.

Data processing system reliability prediction 412 may be stored in data processing system reliability prediction repository 414. Upon storage, data processing system reliability prediction 412 may be accessible for use in an inference model when making a determination for a data processing system on which to perform a workload.

Thus, via the data flow illustrated in FIG. 4A, a system in accordance with an embodiment may generate a reliability prediction for a data processing system. Consequently, a deployment (e.g., 100) may be more likely to be able to provide desired computer implemented services by making a measure of the reliability of the data processing system to perform the workload.

Turning to FIG. 4B, a fourth data flow diagram in accordance with an embodiment is shown. The fourth data flow diagram may illustrate data used in and data processing performed in determining potential data processing systems on which to perform a workload.

To determining the potential data processing systems on which to perform a workload, workload request process 416 may be performed. During workload request process 416, a request to perform a workload may be made. The workload may include at least one task to perform at least one computer implemented service. The request may be made by an administrator of a deployment.

During workload request process 416, workload description 418 may be generated. To generate workload description 418, details of the description may be enumerated. The details may include (i) an objective of the workload, (ii) tasks that are included in the workload, (iii) data that can be ingested by the tasks, (iv) data that can potentially be output by the tasks, (v) software and dependencies that may be used in a task of the tasks, etc. Workload description 418 may be generated by an administrator, project manager, etc.

Once workload description 418 is generated, workload requirements identification 420 may be performed. During workload requirements identification 420, requirements to perform the workload by a deployment (e.g., deployment 100) may be determined. The requirements may be determined by (i) ingesting workload description 418 and (ii) generating, based on workload description 418, the requirements to complete the tasks included in the workload.

The requirements may include (i) a timeframe during which the workload is expected to be performed, (ii) storage resources necessary for performance of the workload, and/or (iii) deployment to a data processing system with a value for a reliability prediction (e.g. data processing system reliability prediction 412) equal to or greater than a minimum threshold value. The requirements may be included in workload requirements 422.

Workload requirements 422 may be validated with respect to at least one potential data processing system. By validating workload requirements 422, the workload may be confirmed to be able to be performed on the at least one potential data processing system. To perform the validation, workload validation process 434 may be performed. During workload validation process 434, at least one availability for data processing system availabilities 428 may be obtained.

To obtain the at least one availability for data processing system availabilities 428, data processing system availability query process 426 may be performed. During data processing system availability query process 426, the at least one availability for data processing systems in a deployment (e.g., 100) may be obtained from data processing system availability repository 424. Data processing system availabilities 428 may include the at least one availability. Data processing system availabilities 428 may be compared to the timeframe during which a workload can be performed. If the at least one availability of data processing system availabilities 428 falls within the timeframe, then the data processing system may be included in potential data processing systems locations 436.

In addition, at least one reliability prediction for data processing system reliability predictions 432 may be obtained. To obtain the at least one value for data processing system reliability predictions 432, data processing system reliability query process 430 may be performed. During data processing system reliability query process 430, the at least one reliability prediction for data processing systems in a deployment (e.g., 100) may be obtained from data processing system reliability prediction repository 414. Data processing system reliability predictions 432 may include the at least one reliability prediction. The at least one reliability prediction of data processing system reliability predictions 432 may be compared to a minimum threshold value for a reliability prediction specified by workload requirements 422. If the at least one reliability prediction meets or exceeds the minimum threshold value for the reliability prediction, the data processing system with the at least one reliability prediction may be included in potential data processing systems locations 436.

Given data processing systems with data processing system availabilities 428 and data processing system reliability predictions 432, during workload validation process 434, the data processing systems may be filtered further. The data processing systems may be filtered by including data processing systems that (i) have reliability predictions that meet and/or exceed the minimum threshold value for the reliability prediction specified by workload requirements 422 and (ii) have availabilities that are within the timeframe specified by workload requirements 422. By the filtering, data processing systems that only meet one of the two conditions may be removed from potential data processing systems locations 436.

Thus, via the data flow illustrated in FIG. 4B, a system in accordance with an embodiment may determine potential data processing systems on which to perform a workload. Consequently, a deployment (e.g., 100) may be more likely to be able to provide desired computer implemented services by selecting data processing systems in the deployment that meet requirements of the workload.

Turning to FIG. 4C, a fifth data flow diagram in accordance with an embodiment is shown. The fifth data flow diagram may illustrate data used in and data processing performed in generating a new instance of a container to perform a workload.

To generate the new instance of the container, data processing system identification process 438 may be performed. During data processing system identification process 438, data processing systems of potential data processing systems locations 436 may be ranked. The data processing systems of potential data processing systems locations 436 may be ranked based on reliability predictions for the data processing systems. The reliability predictions for the data processing systems may be obtained from data processing system reliability prediction repository 414.

From a ranked list of the data processing systems, data processing system identifier 440 may be chosen. Data processing system identifier 440 may be chosen by selecting the data processing system with a highest ranking on the ranked list. From the data processing system with the highest ranking, data processing system identifier 440 may be obtained from the data processing system.

Using data processing system identifier 440 to identify the data processing system, data storage device selection 442 may be performed. During data storage device selection 442, a data storage device of the data processing system may be selected. The data storage device may be selected by (i) obtaining the reliability predictions of data storage devices of the data processing system, and (ii) choosing a data storage device with the highest reliability prediction of the data storage devices of the data processing system. The reliability predictions of data storage devices may be obtained from data storage device reliability prediction repository 410. The data storage device with the highest reliability prediction may have a high likelihood of retaining data during performance of the workload.

With selection of the data storage device of the data processing system, new container instance process 444 may be performed. During new container instance process 444, the workload may be performed on the data storage device. The workload may be performed by (i) generating a new container instance of a container and (ii) deploying the new container instance on the data storage device of the data processing system to perform the workload. The new container instance may be an executable package of an application. The executable package may include components needed to run the application, such as the application, dependencies, system tools, libraries, and/or configurations settings.

To deploy the new container instance, the new container instance may be stored on the data storage device of the data processing system. After storing the new container instance, the new container instance may be run on the data processing system. By running the new container instance, a workload that consists of at least one task may be performed. By performing the workload on the data storage device, at least one computer implemented service may be provided by the data processing system.

Thus, via the data flow illustrated in FIG. 4C, a system in accordance with an embodiment may determine potential data processing systems on which to generate a new instance of a container to perform a workload. Consequently, a deployment (e.g., 100) may be more likely to be able to provide desired computer implemented services by performing a workload on a data storage device with a high reliability prediction. The reliability prediction may indicate a high likelihood of retaining data used in the workload.

Figure 5A:
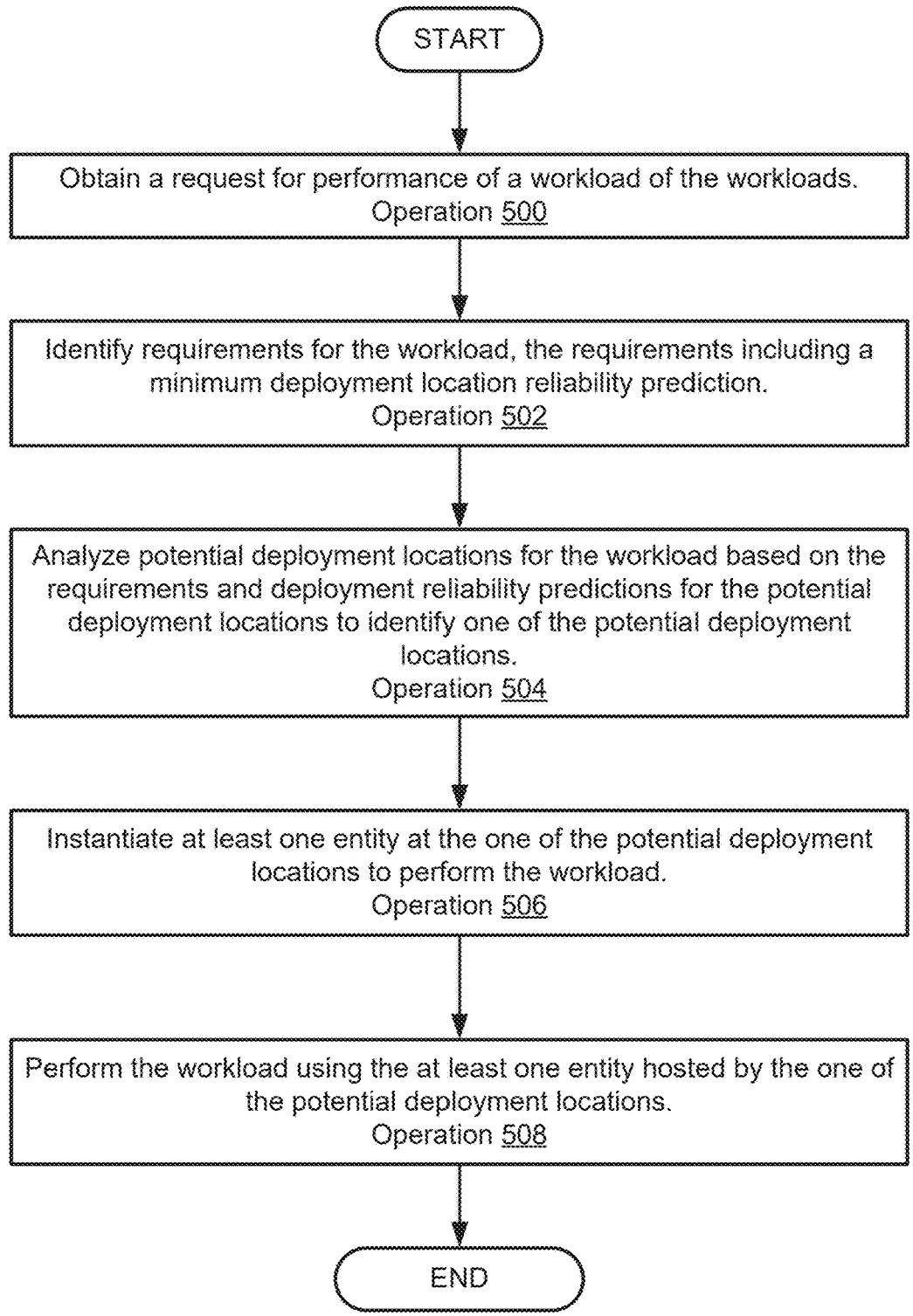
FIGS. 5A-5B show flow diagrams illustrating method in accordance with an embodiment.
Figure 5B:
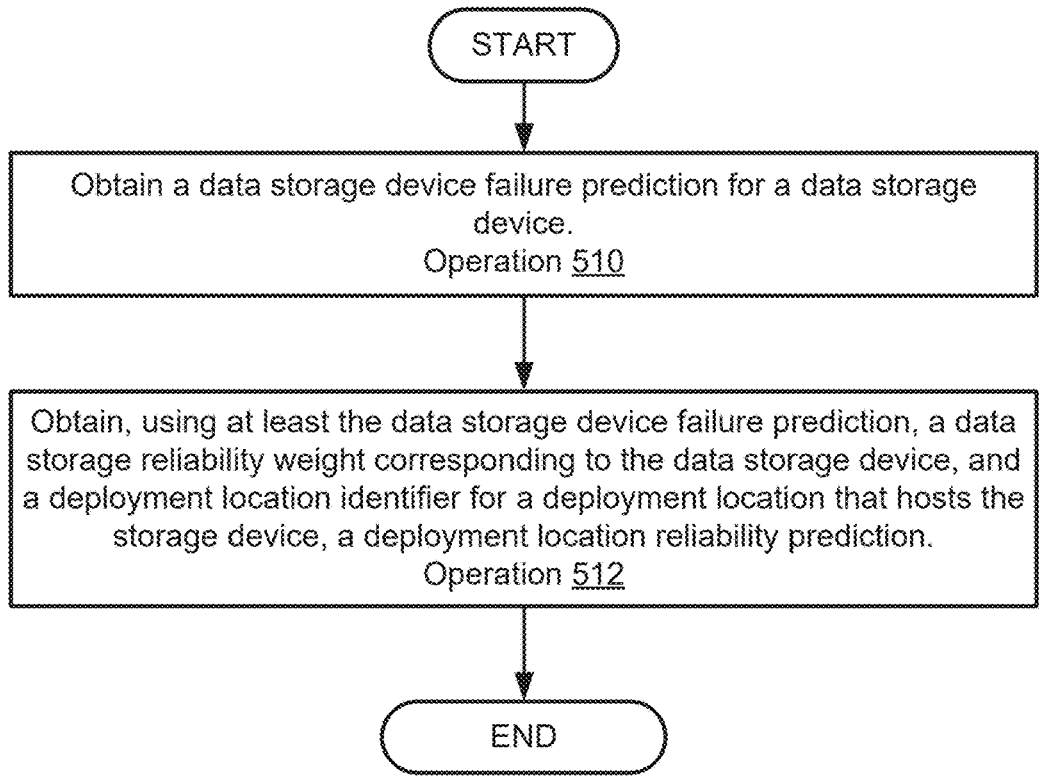

As discussed above, the components of FIGS. 1A-1B may perform various methods to manage data processing systems. FIG. 5A-5B illustrates methods that may be performed by the components of the system of FIGS. 1A-1B. In the diagram discussed below and shown in FIG. 5A-5B, any of the operations may be repeated, performed in different orders, and/or performed in parallel with or in a partially overlapping in time manner with other operations.

Turning to FIG. 5A, a flow diagram illustrating a method of managing performance of workloads in accordance with an embodiment is shown. The method may be performed, for example, by any of the components of the system of FIGS. 1A-1B, and/or other components not shown therein.

At operation 500, a request for performance of a workload of the workloads may be obtained. The request may be obtained by receiving a request, from, for example, an administrator and/or project manager, to perform the workload. The workload may include at least one task to perform a computer implemented service.

At operation 502, requirements for the workload may be identified, the requirements including a minimum deployment location reliability prediction. The requirements may be identified by (i) ingesting a description of the tasks included in the workload and (ii) identifying, based on the description, the requirements to complete the tasks.

At operation 504, potential deployment locations for the workload, based on the requirements and deployment reliability predictions for the potential deployment locations, may be analyzed to identify one of the potential deployment locations. The potential deployment location of the potential deployment locations may be analyzed by (i) obtaining a deployment location availability for the one of the potential deployment locations, the deployment location availability including a timeframe during which the workload can be performed at the one of the potential deployment locations, (ii) evaluating, based on the requirements for the workload, whether the workload can be performed by the one of the potential deployment locations during the deployment location availability; (iii) obtaining, for the one of the potential deployment locations, the deployment location reliability prediction; and (iv) evaluating, based on the requirements for the workload, whether the deployment location reliability prediction at least meets a minimum reliability threshold for the performance of the workload.

The deployment location availability for the one of the potential deployment locations may be obtained by extracting the deployment location availability from a repository of deployment location availabilities of the potential deployment locations. Whether the workload can be performed by the one of the potential deployment locations during the deployment location availability may be evaluated by comparing the timeframe of the workload to the deployment location availability. If the timeframe falls within the deployment location availability, then the workload may be performed by the one of the potential deployment locations.

The deployment location reliability prediction for the one of the potential deployment locations may be obtained by extracting the deployment location reliability prediction from the repository of the deployment location reliability predictions. Whether the deployment location reliability prediction at least meets a minimum reliability threshold for the performance of the workload may be evaluated by comparing the deployment location reliability prediction to the minimum reliability threshold. If the deployment location reliability prediction meets and/or exceeds the minimum reliability threshold, then the workload may be performed by the one of the potential deployment locations.

At operation 506, at least one entity may be instantiated at the one of the potential deployment locations to perform the workload. The at least one entity may be instantiated by generating a new container instance from the at least one entity. The new container instance may be an executable package of an application. The executable package may include components needed to run the application, such as the application, dependencies, system tools, libraries, and/or configurations settings.

At operation 508, the workload may be performed using the at least one entity hosted by the one of the potential deployment locations. The workload may be performed by executing the application on the new container instance. By executing the application, at least one task of the workload may be performed and therefore at least one computer implemented service may be provided by the deployment.

The method may end following operation 508.

Thus, via the method shown in FIG. 5A, embodiments herein may likely improve a likelihood of managing performance of workloads. By improving the likelihood of managing performance of workloads, the data processing systems may be more likely to provide desirable computer implemented services by, for example, generating a reliability prediction for at least one data storage device and for at least one data processing system, using the reliability prediction to select the at least one data storage device of the at least one data processing system to perform a workload, etc.

Turning to FIG. 5B, a flow diagram illustrating a method of managing performance of workloads in accordance with an embodiment is shown. The method may be performed, for example, by any of the components of the system of FIGS. 1A-1B, and/or other components not shown therein. The method may be performed before performing the method described in FIG. 5A.

At operation 510, a data storage device failure prediction may be obtained for a data storage device. The data storage device failure prediction by (i) generating a use quantification of a data storage device by measuring attributes of components of the data storage device to quantify and (ii) forecasting, based on the use quantification, a likelihood of failure by the data storage device. Refer to descriptions of FIGS. 2A-2B for more details.

At operation 512, a deployment location reliability prediction may be obtained using at least the data storage device failure prediction, a data storage reliability weight corresponding to the data storage device, and a deployment location identifier for a deployment location that hosts the storage device. The deployment location reliability prediction may be obtained identifying the data processing system using the deployment location identifier.

Once the data processing system is identified, the data storage device failure prediction may be used to compute a data storage reliability prediction. The data storage reliability prediction may be a measure of likelihood that data will be retained while the data storage device performs at least one task of a workload.

With at least one data storage reliability prediction and at least one data storage reliability weight, the deployment location reliability prediction for the data processing system may be computed. The deployment location reliability prediction for the data processing system may include a weighted sum. The weighted sum may include a sum of product of the at least one data storage reliability prediction and the at least one data storage reliability weight for each data storage drive.

The method may end following operation 512.

Thus, via the method shown in FIG. 5B, embodiments herein may likely improve a likelihood of managing performance of workloads. By improving the likelihood of managing performance of workloads, the data processing systems may be more likely to provide desirable computer implemented services by, for example, obtaining a data storage reliability prediction from a data storage failure prediction, using the at least one data storage reliability prediction and the at least one data storage reliability weight to obtain a deployment location reliability prediction, etc.

Any of the components illustrated in FIGS. 1A-2B and FIGS. 4A-4C may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-607 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing performance of workloads, the method comprising:
    obtaining a request for performance of a workload of the workloads;
    identifying requirements for the workload, the requirements comprising a minimum deployment location reliability prediction;
    analyzing potential deployment locations for the workload based on the requirements and deployment reliability predictions for the potential deployment locations to identify one of the potential deployment locations that can reliably retain data generated during performance of the workload to meet the minimum deployment location reliability prediction included in the requirements;

generating a container instance to be executed by the one of the potential deployment locations;

deploying the container instance to the one of the potential deployment locations to cause the one of the potential deployment locations to create a container for performing the workload using the container instance, the one of the potential deployment locations comprises a data processing system that is caused to execute the container instance to create the container; and causing the one of the potential deployment locations hosting the container to perform the workload using the container.

2. The method of claim 1, further comprising:
before obtaining the request for the performance of the workload:
obtaining a data storage device failure prediction for a storage device; and
obtaining, using at least the data storage device failure prediction, a data storage device reliability weight corresponding to the data storage device, and a deployment location identifier for a deployment location that hosts the storage device, a deployment location reliability prediction.

3. The method of claim 2, wherein the deployment location reliability prediction is a measure of likelihood that the data processing system will retain the data generated during the performance of the workload.

4. The method of claim 2, wherein the deployment location reliability prediction is obtained using data storage device failure predictions corresponding to all of data storage devices of the deployment location that are available for contributing storage resources to the performance of the workload.

5. The method of claim 1, wherein the data processing system of the one of the potential deployment location comprises at least one data storage device whose storage resources are used by the container during the performance of the workload by the container.

6. The method of claim 5, wherein the container executes an application using, at least in part, the storage resources contributed by the at least one data storage device of the data processing system.

7. The method of claim 6, wherein the workload comprises at least one service that is provided when the application is being executed by the container on the data processing system.

8. The method of claim 2, wherein a deployment reliability prediction of the deployment reliability predictions for the potential deployment locations is determined using a weighted sum of data storage device failure weights corresponding to data storage devices of one data processing system at one of the potential deployment locations and data storage reliability predictions corresponding to the data storage devices for the one data processing system, a data storage reliability prediction of the data storage reliability predictions being based on the data storage device failure prediction for the data storage device.

9. The method of claim 8, wherein selection, by the container, of at least one data storage device among the data storage devices to use for the workload is determined based on the data storage reliability predictions.

10. The method of claim 1, wherein analyzing the potential deployment locations for the workload comprises:

for the one of the potential deployment locations of the potential deployment locations:
obtaining a deployment location availability for the one of the potential deployment locations, the deployment location availability comprising a timeframe during which the workload can be performed at the one of the potential deployment locations;
evaluating, based on the requirements for the workload, whether the workload can be performed by the one of the potential deployment locations during the deployment location availability;
obtaining, for the one of the potential deployment locations, the deployment location reliability prediction; and
evaluating, based on the requirements for the workload, whether a deployment location reliability prediction at least meets a minimum reliability threshold for the performance of the workload.

11. A non-transitory machine-readable medium having instructions stored therein, which when executed by a processor, cause the processor to perform operations for managing performance of workloads, the operations comprising:
obtaining a request for performance of a workload of the workloads;
identifying requirements for the workload, the requirements comprising a minimum deployment location reliability prediction;
analyzing potential deployment locations for the workload based on the requirements and deployment reliability predictions for the potential deployment locations to identify one of the potential deployment locations that can reliably retain data generated during performance of the workload to meet the minimum deployment location reliability prediction included in the requirements;
generating a container instance to be executed by the one of the potential deployment locations;
deploying the container instance to the one of the potential deployment locations to cause the one of the potential deployment locations to create a container for performing the workload using the container instance, the one of the potential deployment locations comprises a data processing system that is caused to execute the container instance to create the container; and
causing the one of the potential deployment locations hosting the container to perform the workload using the container.

12. The non-transitory machine-readable medium of claim 11, wherein the operations further comprise:
before obtaining the request for the performance of the workload:
obtaining a data storage device failure prediction for a storage device; and
obtaining, using at least the data storage device failure prediction, a data storage device reliability weight corresponding to the data storage device, and a deployment location identifier for a deployment location that hosts the storage device, a deployment location reliability prediction.

13. The non-transitory machine-readable medium of claim 12, wherein the deployment location reliability prediction is a measure of likelihood that the data processing system will retain the data generated during the performance of the workload.

14. The non-transitory machine-readable medium of claim 12, wherein the deployment location reliability prediction is obtained using data storage device failure predictions corresponding to all of data storage devices of the deployment location that are available for contributing storage resources to the performance of the workload.

15. The non-transitory machine-readable medium of claim 11, wherein the data processing system of the one of the potential deployment location comprises at least one data storage device whose storage resources are used by the container during the performance of the workload by the container.

16. A system deployment manager, comprising:
    a processor; and
    a memory coupled to the processor to store instructions, which when executed by the processor, cause the processor to perform operations managing performance of workloads, the operations comprising:
        obtaining a request for performance of a workload of the workloads;
        identifying requirements for the workload, the requirements comprising a minimum deployment location reliability prediction;
        analyzing potential deployment locations for the workload based on the requirements and deployment reliability predictions for the potential deployment locations to identify one of the potential deployment locations that can reliably retain data generated during performance of the workload to meet the minimum deployment location reliability prediction included in the requirements;
        generating a container instance to be executed by the one of the potential deployment locations;
        deploying the container instance to the one of the potential deployment locations to cause the one of the potential deployment locations to create a container for performing the workload using the container instance, the one of the potential deployment locations comprises a data processing system that is caused to execute the container instance to create the container; and
        causing the one of the potential deployment locations hosting the container to perform the workload using the container.

17. The deployment manager of claim 16, wherein the operations further comprise:
    before obtaining the request for the performance of the workload:
        obtaining a data storage device failure prediction for a storage device; and
        obtaining, using at least the data storage device failure prediction, a data storage device reliability weight corresponding to the data storage device, and a deployment location identifier for a deployment location that hosts the storage device, a deployment location reliability prediction.

18. The deployment manager of claim 17, wherein the deployment location reliability prediction is a measure of likelihood that the data processing system will retain the data generated during the performance of the workload.

19. The deployment manager of claim 17, wherein the deployment location reliability prediction is obtained using data storage device failure predictions corresponding to all of data storage devices of the deployment location that are available for contributing storage resources to the performance of the workload.

20. The deployment manager of claim 16, wherein the data processing system of the one of the potential deployment location comprises at least one data storage device whose storage resources are used by the container during the performance of the workload by the container.

* * * * *